US005688598A

United States Patent [19]
Keck et al.

[11] Patent Number: 5,688,598
[45] Date of Patent: Nov. 18, 1997

[54] NON-BLISTERING THICK FILM COATING COMPOSITIONS AND METHOD FOR PROVIDING NON-BLISTERING THICK FILM COATINGS ON METAL SURFACES

[75] Inventors: Mitchell T. Keck, Crystal Lake; Ronald J. Lewarchik, Sleepy Hollow, both of Ill.; Jack C. Allman, Twin Lakes, Wis.

[73] Assignee: Morton International, Inc., Chicago, Ill.

[21] Appl. No.: 672,280

[22] Filed: Jun. 28, 1996

[51] Int. Cl.⁶ .......................... C08L 23/26; C08L 67/02; C08L 61/28; C08L 33/02
[52] U.S. Cl. .......................... 428/458; 428/460; 428/461; 428/462; 428/421; 428/480; 428/482; 428/483; 428/500; 428/515; 428/520; 428/524; 525/451; 525/437; 525/440; 525/441; 525/443; 525/444; 525/445; 525/124; 525/162; 525/163
[58] Field of Search .................... 525/451, 437, 525/440, 441, 443, 444, 445, 124, 162, 163; 428/458, 460, 461, 462, 421, 480, 482, 483, 500, 515, 520, 524

[56] References Cited

U.S. PATENT DOCUMENTS

| | | | |
|---|---|---|---|
| 3,042,545 | 7/1962 | Kienle et al. | 117/75 |
| 4,535,132 | 8/1985 | Ambrose et al. | 525/443 |
| 4,720,403 | 1/1988 | Jasenof et al. | 427/327 |
| 4,720,405 | 1/1988 | Carson et al. | 427/410 |
| 4,756,935 | 7/1988 | Takimoto et al. | 427/410 |
| 4,804,581 | 2/1989 | Geary et al. | 428/332 |
| 4,892,906 | 1/1990 | Pham et al. | 524/730 |

*Primary Examiner*—W. Robinson H. Clark
*Attorney, Agent, or Firm*—Steven C. Benjamin; Gerald K. White

[57] ABSTRACT

A thermosetting, organic solvent-based, primer coating composition for protecting metal surfaces which includes a solvent solution of: (a) a hydroxy-functional polyester resin; (b) a thermosetting acrylic resin; (c) a hydroxy-terminal polybutadiene resin, a hydroxy-terminal epoxidized polybutadiene resin, or mixtures thereof; (d) a blocked isocyanate crosslinker including at least one dimethyl pyrazole blocked isocyanate; (e) an aminoplast crosslinker including at least one melamine-formaldehyde condensate; (f) a catalyst; and, (g) a pigment. The primer exhibits excellent flexibility after curing to allow the primer to be coil coated onto metals as a thicker film and to have the metal subsequently formed without film fracture or loss of adhesion. The primer also has improved solvent release properties during curing to allow volatiles to readily escape therefrom, which facilitates coil coating of the primer onto metals as thicker films that, when cured into thick film hardened surface finishes, do not exhibit the typical blisters, craters, pops, voids and other surface defects. The primer can be cured as well at reduced temperatures which contributes to the reduction in surface defects. A fluorocarbon topcoat is usually coil coated and cured over the non-blistering primer coating, to yield a composite coated metal substrate having a surface finish that is free of blisters, craters, pops, and voids, and other surface defects.

33 Claims, No Drawings

5,688,598

NON-BLISTERING THICK FILM COATING COMPOSITIONS AND METHOD FOR PROVIDING NON-BLISTERING THICK FILM COATINGS ON METAL SURFACES

FIELD OF THE INVENTION

The present invention relates to the field of coating compositions used as primers on metal surfaces to provide coated surfaces that are protected against corrosion and abrasion. The present invention also relates to the field of metal substrates having layers of protective coating compositions applied to their surfaces, where one of the coating layers is a primer composition. Even more particularly, the present invention relates to anticorrosive primer coating compositions for metal surfaces that have excellent flexibility together with excellent solvent release properties. And when the primers of the present invention are applied by coil coating onto the metal surfaces, they are advantageously able to form thick dry film finishes that are virtually free of any blisters, craters, pops, voids, and other surface defects.

BACKGROUND OF THE INVENTION

In the production of structural metal building components, such as sheet metal, there is a need to protect the metal surfaces from corrosion. Prolonged exposure of metal surfaces to corrosive agents, such as salt and humidity, and corrosive industrial pollutants, including sulfur dioxide, nitrogen dioxide, carbon dioxide, and fly ash, tends to degrade the quality and appearance of the metal. A variety of anticorrosive coating compositions have been formulated and applied to metal surfaces for long-term protection of the metal substrate. Primer coatings applied to metal surfaces before application of a finish or top coating can increase the level of protection provided to the metal.

Considerable efforts have been directed to developing primers for metal that are derived from organic solvent-based thermosetting resins. The primer coatings must have good corrosion resistance, abrasion resistance, and adhesion with the metal substrate and an overcoat. The primers must also have good flexibility to facilitate coil coating fabrication and subsequent forming of the coated metal substrate without film fracture or loss of the adhesion. And the primers must be able to form a continuous hardened surface finish over the coated metal substrate without imperfections, such as blisters, craters, pops and voids, which not only detract from the aesthetic appearance of the coating, but also provide thinned or discontinuous coating regions on the underlying metal substrate that are more susceptible to corrosive attack.

Primer coatings are typically applied to metal by a variety of methods, such as by brush, spray and immersion techniques, although it is generally preferred to coat metal surfaces by coil coating techniques. The coated metal is then heated to cure the primer into a hardened surface finish.

Coil coating is commonly used in the construction industry for coating, for example, sheets of galvanized steel that are used for building panels, including wall and roofing panels. Coil coating is a particularly useful technique for coating large surface areas whereby: a coiled metal sheet is unrolled to expose the metal surface; the exposed surface is first cleaned and chemically pretreated and then baked at between about 180° F. and 200° F.; next the surface is coated with the primer composition by reverse roll coating and the primer coating is then baked to cure the primer into a hardened film on the metal surface which is followed by a water quench; next a top or finish coating is coated over the primer coating by reverse roll coating and the top coat is then baked to cure which is followed by a water quench; and, finally the coated metal sheet is recoiled, all in a continuous operation. Usually, a backer is simultaneously applied to the reverse side of the sheet metal during the primer application step.

Once the sheet is coil coated, the primer coating must especially be able to withstand severe deformation without disrupting the continuity of the coating. This is particularly important in the production of wall and roofing panels which are coated metal sheets that are subsequently bent and formed to a given configuration. Any fracture, break or loss of adhesion in the coatings as the metal surface is bent during coating or forming would provide an area susceptible to corrosion.

Matters are complicated where it is desired to coil coat sheet metal with primer coatings applied as thicker films, either with a single layered or multi-layered primer films. The advantage of a thick film primer is the increased protection it affords the underlying metal substrate. The thicker film acts as a greater barrier to physical damage and atmospheric corrosion which might be transferred through the top coat layers. However, thick film primer coatings are typically much less flexible after curing and, accordingly, generally have less ability to withstand the severe deformation forces without loss of film continuity as the coated metal sheet is formed.

Attempts have been made to increase the flexibility of primers after curing to facilitate thick film coil coating fabrication and subsequent forming.

For example, U.S. Pat. No. 4,720,403 (Jasenof et al.) discloses an anticorrosive double-layered primer coating composition derived from organic solvent-based thermosetting solutions with claimed improved flexibility after curing to facilitate thick film coil coating onto a metal surface. The first primer coat includes an organic solvent-soluble polyepoxide resin, an aminoplast, phenoplast or blocked isocyanate curing agent for the polyepoxide, an epoxy-phosphate, an anti-corrosive chromium-containing pigment, and a clay having the ability to fix the phosphate. The second primer coat includes an organic solvent-soluble polyhydric alcohol coat resin, such as a hydroxy-functional polyester of glycerin and phthalic anhydride or a copolymer of a hydroxy ethyl acrylate, a polyisocyanate curing agent for the polyhydric alcohol, and an anticorrosive chromium-containing pigment.

U.S. Pat. No. 4,720,405 (Carson et al.) discloses another anticorrosive primer coating composition derived from thermosetting organic solvent solutions with claimed good flexibility after curing for thick film coil coating fabrication. This primer coating contains a polyepoxide resin, an organic polyol, such as acrylic polyols, polyester polyols, polyurethane polyols, or polyether polyols, a polyisocyanate crosslinking agent, and a phenolic resin. The primer coating composition is said to be flexible having a percent elongation of at least 10 percent when cured.

While considerable attention has been devoted in the coil coating industry to provide flexible thick film primers, other problems associated with the curing of thicker primer films have arisen. For instance, one drawback is that it is difficult to obtain generally smooth, i.e., blister-free, thick film primer finishes over coil coated metal substrates. This is due to a problem known as "popping" which is believed to occur by release of volatile materials in the primer which erupt through the coating during heat curing.

Primer compositions of the prior art, when applied to form thick films, generally lack the ability to allow volatile materials, such as solvents and residual moisture, to satisfactorily escape from the film during baking. In thicker film applications, the upper lamina of the primer tends to cure to a hard and impervious film before all of the volatiles within the film can be released. Incomplete removal of volatile materials present in the primer before dry film formation causes blistering, cratering, and popping scars on the surface of the primer film, since the trapped volatiles must vent through the hardened surface film. In addition, conventional primer compositions require relatively high cure temperatures generally between 450° F. and 465° F. peak metal temperature. High temperature cures can exacerbate popping and, thus, contribute to formation of surface defects.

Surface imperfections, such as blisters, craters, pops and voids are undesirable because they interfere with the aesthetic appearance and smoothness of the surface finish on the coated metal substrate. Surface defects are also functionally undesirable, since they cause thin spots or discontinuities in the coatings that provide areas on the coated metal that are much more prone to physical damage and corrosive attack. Furthermore, when a finish coating is applied and baked over the thicker primer layer, the trapped volatiles within the thick primer film continue to escape and, therefore, the blistering, cratering, and popping defects tend to be transferred to the surface of the finish coating, which is highly undesirable.

What is needed is a primer coating composition that has enhanced solvent release abilities during curing and/or can cure at reduced temperatures to minimize the extent of popping when applied as a thick film and consequently allow volatile materials present in the primer coating to satisfactorily vent from the thick film during curing without scarring the surface finish of the thick primer film or overlying top coat with blisters, craters, pops, voids and other surface defects. What is also needed is a primer coating composition that is flexible after curing to allow thick dry film formation on metal surfaces during coil coating fabrication and subsequent forming operations without film fracture or loss of adhesion.

SUMMARY OF THE INVENTION

It is an object of the present invention, therefore, to provide a primer coating composition for metal surfaces which exhibits improved solvent release properties during curing to facilitate application as thick films, especially by coil coating techniques, without causing blisters, craters, pops, voids and other surface defects in the cured dry film.

It is another object of the present invention to provide a primer coating composition for metal surfaces which exhibits curing at relatively lower cure temperatures to facilitate application as thick films, especially by coil coating techniques, without causing blisters, craters, pops, voids and other surface defects in the cured dry film.

Yet another object of the present invention to provide a primer coating composition for metal surfaces which exhibits good flexibility after curing to facilitate application as thick films, especially by coil coating techniques, and subsequent forming without film fracturing or loss of adhesion.

It is another object of the present invention to provide a primer coating composition which exhibits improved intercoat adhesion with a top coat.

Still another object of the present invention to provide a flexible, non-blistering, primer coating composition for metal surfaces with good corrosion and abrasion resistance.

It is a related object of the present invention to provide a coated substrate, particularly a coil coated metal substrate, that has a continuous thick dry film of a primer coating formed on its surfaces without having blisters, craters, pops, voids and other surface imperfections.

It is another related object of the present invention to provide a method for coating metal surfaces with the aforesaid thick film primer coating composition and a top coat composition without having blisters, craters, pops, voids and other defects formed on the coated metal surfaces upon curing.

These and other objects, features and advantages of the present invention will become apparent from the following description of the specification and claims.

In one aspect, the present invention resides in a non-blistering, flexible thick film primer coating composition that is characterized by including: (a) from about 40 wt. % to about 92 wt. % of total resin solids, and preferably from about 50 wt. % to about 85 wt. %, and even more preferably from about 60 wt. % to about 80 wt. %, of a hydroxy-functional polyester resin; (b) from about 0 wt. % to about 15 wt. % of total resin solids, and preferably from about 2 wt. % to about 15 wt. %, and even more preferably from about 5 wt. % to about 10 wt. %, of a thermosetting acrylic resin; (c) from about 3 wt. % to about 15 wt. % of total resin solids, and preferably from about 7 wt. % to about 15 wt. %, and even more preferably from about 8 wt. % to about 13 wt. %, of a hydroxy-terminal polybutadiene resin, a hydroxy-terminal epoxidized polybutadiene resin, or mixtures thereof; (d) from about 3 wt. % to about 20 wt. % of total resin solids, and preferably from about 5 wt. % to about 10 wt. %, and even more preferably from about 5 wt. % to about 10 wt. %, of blocked isocyanate crosslinker, preferably comprising at least one dimethyl pyrazole blocked isocyanate; (e) from about 1 wt. to about 10 wt. % of total resin solids, and preferably and even more preferably from about 2 wt. % to about 7 wt. %, of an aminoplast crosslinker, preferably comprising at least one melamine-formaldehyde condensate; (f) from about 0.05 wt. % to about 0.7 wt. % of total resin solids, and preferably and even more preferably from about 0.1 wt. % to about 0.5 wt. %, of a catalyst; (g) a pigment; and, (h) an organic solvent, in which the resins solids preferably comprises from about 25 wt. % to about 50 wt. %, and even more preferably from about 30 wt. % to about 45 wt. %, of the total weight of the primer composition, and the pigment preferably comprises from about 20 wt. % to about 45 wt. %, and even more preferably from about 25 wt. % to about 40 wt. %, of the total weight of the primer composition. The primer composition can be coil coated and heat cured onto a metal substrate to form a continuous, dry thick film preferably of about 0.8 to 1.6 mils thick or thicker, that is virtually free of blisters, craters, voids, and other surface imperfections.

In another aspect, the present invention resides in a method of protecting a metal substrate with a composite protective coating characterized by: (a) applying by coil coating at least one layer of an organic solvent solution a non-blistering, thick film primer coating composition, as described above, to an uncoiled metal sheet to form a first primer layer; (b) heat curing the first primer layer on the metal sheet, preferably by baking at a temperature from about 400° to about 465° F. peak metal temperature; (c) over coating the primer layer by coil coating with at least one layer of a top coating composition to form a second top coat layer, in which the top coating composition is a fluorocarbon polymer; and, (d) heat curing the top coat layer on the primer layer, preferably by baking at a temperature from about 450° to 480° F. peak metal temperature, to form a composite coated metal substrate having a surface finish that is virtually free of blisters, craters, voids and other surface imperfections.

In yet another aspect, the present invention resides is a coil coated metal substrate having one or more layers of the aforesaid non-blistering, thick film primer coating composition coated as a thick film and cured on its surface and also, if desired, also having one or more top coat layers of a fluorocarbon polymer coated and cured over the thick film primer layer, to form a corrosion and abrasion protected, coated metal substrate having a surface finish that is virtually free of blisters, craters, voids and other surface imperfections.

DETAILED DESCRIPTION OF THE PREFERRED EMBODIMENTS OF THE INVENTION

The present invention provides flexible, non-blistering, corrosion and abrasion resistant liquid coating compositions derived from organic solvent-based thermosetting resins that are suitable for use as protective primer coatings on metal surfaces, such as galvanized steel, cold rolled steel, aluminum, and the like. The primer compositions of the present invention have excellent flexibility after curing for application as thick films on metal surfaces, especially during coil coating operations. And most importantly, the primer compositions of the present invention have excellent solvent release properties during curing to prevent trapping volatiles in the thick films that tend to cause blistering, cratering, and popping defects in the surface of the primer films and also in a top coat film subsequently applied thereover.

The primer coatings of the present invention can be applied to the metal surface as a single layered film or multi-layered film to provide the desired dry film thickness, however, a single layered film is most preferred. The primer compositions are preferably applied to the metal surface in a suitable amount to provide dry thick films after cure of between about 0.8 and about 1.6 mils thick that are free of blisters, craters, pops, voids and other surface imperfections. This blister-free and crater-free performance at such high dry film thicknesses is generally unattainable with conventional primers that exist today in the coatings industry. The primer compositions may be applied to form an even thicker dry films without surface defects, but the aforesaid range is usually sufficient to provide the desired corrosion and abrasion resistance to the metal surface.

The primer coatings of the present invention can be applied to the metal by roll coating, commonly referred to as coil coating, immersion coating, spray coating, and other known coating methods. Coil coating, however, is the most preferred method in this invention. The primer coatings of this invention are primarily designed for coil coating applications.

In accordance with the present invention, the primer coating composition comprises as a first component, an organic solvent-soluble, thermosetting, hydroxy-functional polyester resin or mixtures thereof. A wide variety of hydroxy-functional polyester resins are useful in the practice of the present invention. The hydroxy-functional polyester resins suitable for use in this invention generally have a hydroxyl value ranging from about 20 to 120, preferably from about 25 to 65, and even more preferably from about 40 to 55. The hydroxy-functional polyester resins generally have an acid value ranging from about 0.25 to 10, preferably from about 1 to 5, and even more preferably from about 1 to 3. The hydroxy-functional polyester resins generally have a weight average molecular weight ranging from about 5,000 to 9,000, preferably from about 6,000 to 8,000, and even more preferably from about 6,500 to 8,000.

The hydroxy-functional polyester resins can be prepared by any of the known synthesis methods, for example, condensation reactions between aliphatic or aromatic di- or poly-hydric alcohols and aliphatic, alicyclic or aromatic di- or poly-carboxylic acids or anhydrides thereof. Typically, the reactants are aliphatic or aromatic di-carboxylic acids and aliphatic or aromatic di-hydric alcohols.

Aliphatic di- or poly-hydric alcohols are commonly used to prepare the hydroxy-functional polyester resins. Examples of suitable aliphatic diols, include ethylene glycol, 1,2-propanediol, 1,3-propanediol, 1,2-butanediol, 1,3-butanediol, 1,4-butanediol, 2,2-dimethyl propane-1,3-diol, i.e., neopentyl glycol, 1,6-hexanediol, 2,3-hexanediol, 2,5-hexanediol, diethylene glycol, dipropylene glycol, 2-methyl-1,3-propanediol, 2,2,4-trimethyl-1,3-pentanediol, 2-butyl-2-ethyl-1,3-propanediol, hydrogenated bisphenol A, cyclohexanediol, and cyclohexanedimethanol, and the like. Examples of suitable aliphatic polyols, include trimethylolpropane, trimethylolethane, pentaerythritol, glycerine, and the like. Examples of suitable aromatic diols, include bisphenol A, bisphenol F, bisphenol A polyethylene glycol ether, and the like. And, examples of suitable aromatic polyols, include triphenolethane, tetraphenolethane, and the like.

Aromatic di- or poly-carboxylic acids or anhydrides thereof are commonly used to prepare the hydroxy-functional polyester resins. Examples of suitable aromatic dibasic carboxylic acids, include phthalic acid, isophthalic acid, terephthalic acid, 4-methylphthalic acid, tetrachlorophthalic acid, or anhydrides thereof, and the like. Examples of suitable aromatic polybasic carboxylic acids, include trimellitic acid, pyromellitic acid, or anhydrides thereof, and the like. Examples of suitable aliphatic dibasic carboxylic acids, include tetrahydrophthalic acid, hexahydrophthalic acid, adipic acid, pimelic acid, suberic acid, azelaic acid, sebacic acid, maleic acid, fumaric acid, glutaric acid, malonic acid, succinic acid, chlorendic acid, dedecanedioic acid, 1,4-cyclohexanedicarboxylic acid, or anhydrides thereof, and the like. Examples of suitable aliphatic polybasic carboxylic acids, include tricarballylic acid, 1,3,5-cyclohexanetricarboxylic acid, or anhydrides thereof, and the like.

The hydroxy-functional polyester resin component is generally present in the primer composition of the present invention in an amount ranging from about 40 to 92 percent by weight, and preferably from about 50 to 85 percent by weight, and even more preferably from about 60 to 80 percent by weight, based on the total resin solids content of the primer composition. Throughout this specification, all parts and percentages are by weight, unless otherwise specified.

The primer coating composition of the present invention comprises as a second component, an organic solvent-soluble, thermosetting acrylic resin or mixtures thereof. A wide variety of acrylic resins are useful in the practice of the present invention. The thermosetting acrylic resins suitable for use in this invention generally have an acid value ranging from about 4 to 12, preferably from about 5 to 11, and even more preferably from about 6 to 10. The thermosetting acrylic resins have a weight average molecular weight ranging from about 1,000 to 1,000,000.

The thermosetting acrylic resins can be prepared by any of the known synthesis methods, for example, free radical polymerization reactions between acrylic monomers using a radical initiator. Monomers which can be used are methyl acrylate, methyl methacrylate, ethyl acrylate, ethyl methacrylate, 2-ethyl acrylate, 2-ethyl methacrylate, isobutyl acrylate, iso-butyl methacrylate, n-hexyl acrylate, n-hexyl methacrylate, acrylic acid, methacrylic acid, N-(n-butoxymethyl) acrylamide, N-(sec-butoxymethyl) acrylamide, N-(iso-butoxymethyl) acrylamide, N-(tert-butoxymethyl acrylamide, and the like. Radical initiators, such as peroxides, peresters, or azo compounds can be employed in the polymerization, for example, benzoyl peroxide, di-tert-butyl peroxide, di-iso-butyryl peroxide, tert-butyl peroxyneodecanoate, tert-butyl peroxy-2-ethylhexanoate, 2,2'-azobis (isobutyronitrile), 2,2'-azobis(2-methylbutyronitrile), and the like.

The thermosetting acrylic resin is generally present in the primer composition of the present invention in an amount ranging from about 0 to 15 percent by weight, and preferably from about 2 to 15 percent by weight, and even more preferably from about 5 to 10 percent by weight, based on the total resin solids content of the primer composition.

The primer composition of the present invention comprises as a third component, an organic solvent-soluble, known polybutadiene synthesis methods. For example, polybutadiene polymers are generally prepared by addition homopolymerization of 1,3-butadiene ($H_2C=CH-CH=CH_2$) by 1,2- or 1,4-addition reactions. 1,2-additions yield vinyl isomers with pendant vinyl groups. 1,4-additions yield cis- or trans- isomers with internal double bonds on the polymer chains. The hydroxy-terminal polybutadiene polymers suitable for use in this invention Can be formed with cis-, trans-, or vinyl-microstructures, or mixtures thereof. The polybutadiene polymers can be internally epoxidized by any of the known epoxidation synthesis methods. For example, an internally epoxidized polybutadiene can be prepared through epoxidation reaction with peracetic acid ($CH_3CO_3H$). Hydroxyl groups, preferably used to form hydroxyl terminated polybutadiene diols, can be added to the polymer chain by any of the known synthesis methods.

Exemplary hydroxy-terminal polybutadiene polymers that can be used in the primer composition of the present invention have the simplified chemical formula (2):

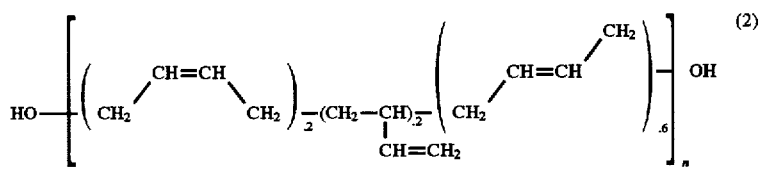

hydroxy-terminal polydiene polymer or copolymer resin or mixtures of the like. The hydroxy-terminal polydiene polymers can be polymerized from dienes generally having from about 4 to 10 carbon atoms, although homopolymers of butadienes are the most preferred polymers.

Accordingly, a preferred hydroxy-terminal polydiene polymer comprises a hydroxy-terminal polybutadiene polymer or mixtures thereof. A wide variety of hydroxy-terminal polybutadiene polymer resins are useful in the practice of this invention. For example, polybutadiene diols having the general formula (1) are suitable for use in this invention:

where B represents the butadiene backbone, and n is preferably between about 1 and 100, and even more preferably between about 25 and 50, although higher degrees of polymerization are also included. Another even more preferred hydroxy-terminal polydiene polymer comprises an internally epoxidized hydroxy-terminal polybutadiene polymer or mixtures thereof. A wide variety of hydroxy-terminal epoxidized polybutadiene polymer resins are useful in the practice of this invention. For example, polybutadiene diols having the aforesaid general formula (1) with internal epoxy groups substituted throughout the polymer backbone in place of internal carbon to carbon double bonds are suitable for use in this invention, preferably having between about 1 and 10% epoxy oxygen content, although higher epoxy oxygen contents are also included. In addition, mixtures of hydroxy-terminal polybutadienes and hydroxy-terminal epoxidized polybutadienes can be used in this invention. The preferred hydroxy-terminal polybutadiene polymers and even more preferred epoxidized derivatives thereof preferably have a number average molecular weight ranging from about 1,000 to 5,500, more preferably from about 2,000 to 3,000, and even more preferably from about 2,500 to 2,700.

The hydroxy-terminal polybutadiene polymers and epoxidized derivatives thereof can be prepared by any of the where n is preferably from about 20 to 60, and even more preferably n is either about 25 or about 50, although higher degrees or lower degrees of polymerization are also possible. The preferred hydroxy-terminal polybutadiene polymers of formula (2) generally have a number average molecular weight ranging from about 1,000 to 5,500, preferably from about 2,000 to 3,000, and even more preferably from about 2,500 to 2,700. The preferred formula (2) polymers generally have a hydroxyl functionality ranging from about 2.2 to 2.6. Examples of hydroxy-terminal polybutadienes of formula (2) are sold under the tradenames Poly bd R-45HT Resin (n is about 50, no. avg. mol. wt. is about 2,700, and hydroxyl functionality is about 2.4–2.6), Poly bd R-45M Resin (n is about 50, no. avg. mol. wt. is about 2,600, and hydroxyl functionality is about 2.2–2.4), and Poly bd R-20LM Resin (n is about 25, no. avg. mol. wt. is about 1,230, and hydroxyl functionality is about 2.4–2.6) by Elf Atochem of Philadelphia, Pa.

Exemplary hydroxy-terminal epoxidized polybutadiene polymers that can be used in the primer composition of the present invention have the simplified chemical formula (3):

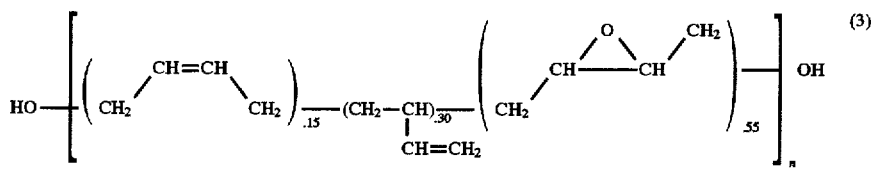

where n is preferably from about 20 to 60, and even more preferably n is about 25, although higher or lower degrees of polymerization are also possible. The preferred hydroxy-terminal epoxidized polybutadiene polymers of formula (3) generally have a number average molecular weight of from about 1,000 to 5,500, more preferably from about 2,000 to 3,000, and even more preferably from about 2,500 to 2,700. The preferred formula (3) polymers generally have a hydroxy functionality of about 2.7. The oxirane oxygen content of the preferred formula (3) polymers is preferably from about 1 to 10%, and even more preferably from about 2 to 7 %. Examples of hydroxy-terminal epoxidized polybutadienes of formula (3) are sold under the tradenames Poly bd 600 Resin (n is about 25, no. avg. mol. wt. is about 2,600, oxirane oxygen content is about 3.5%, and hydroxyl functionality is about 2.7) and Poly bd 605 Resin (n is about 25, no. avg. mol. wt. is about 2,400, oxirane oxygen content is about 5.2%, and hydroxyl functionality is about 2.7) by Elf Atochem of Philadelphia, Pa.

The hydroxy-terminal polydiene polymer, including the hydroxy-terminal polybutadiene and/or hydroxy-terminal epoxidized polybutadiene, is generally present in the primer composition of the present invention in an amount ranging from about 3 to 15 percent by weight, and preferably from about 7 to 15 percent by weight, and even more preferably from about 8 to 13 percent by weight, based on the total resin solids content of the primer composition.

While not wishing to be bound by theory, it is believed that the advantageous results of the invention, that is, the attainment of flexible, thick film primer coatings without blisters, craters, pops, voids and other surface defects, are obtained in part because of the presence of the hydroxy-terminal polybutadiene polymer component and/or epoxidized derivative thereof. It is believed that this primer component synergistically increases the solvent release properties of the primer composition during curing by allowing the coating to remain open for an extended period of time before closing to form a continuous hardened final film. Accordingly, volatile materials present in the primer composition, such as solvents and residual moisture, can readily escape through the film while baking at elevated curing temperatures, even when the primer is coated onto a metal substrate as a thick film. Whereas, with conventional primers, as the dry film thickness is increased, it becomes increasingly more difficult to vent the volatiles before the primer coat hardens. A substantial portion of the volatiles in conventional primers tend to be released through a hardened film, thereby causing blisters, craters, pops, voids and other surface defects. The hydroxy-terminal polybutadiene component and/or epoxy derivative thereof also tend to increase the flexibility of the final primer film due to the rubbery nature of polybutadienes.

A very important aspect of the above-described primer coating composition, therefore, is its solvent permeability during curing combined with its flexibility after curing. After curing the primer composition forms a hard, substantially impervious, continuous dry film resistant to corrosion and abrasion. Despite the enhanced solvent release rates during curing, there is no degradation in the hard and impervious protective nature of the film when cured. The flexibility after curing of the primer composition advantageously allows it to be applied to a metal substrate as relatively thicker films during coil coating fabrication than conventional primer compositions without sacrificing formability. And the solvent permeability during curing of the primer composition advantageously allows it to be applied at relatively thicker films during coil coating fabrication than conventional flexible primer compositions without sacrificing coated surface quality and corrosion protection. A flexible primer for coil coating application to metal surfaces which can be applied and formed as thick films without blistering, cratering, popping, and other surface defects has not heretofore been discovered until the present invention.

The primer coating composition of the present invention comprises as a fourth component, a curing agent or crosslinker. The curing agent is provided for the hydroxy-functional polyester component, the thermosetting acrylic resin component, and the hydroxy-terminal polybutadiene polymer component. The curing of the primer composition of the present invention is generally based on a urethane cure system. Curing agents suitable for a urethane cure include organic solvent-soluble blocked isocyanates, aminoplasts, or mixtures thereof. In the present invention, it is especially preferred to include mixtures of the blocked isocyanate and aminoplast curing agents in the primer composition. The curing agent is generally provided in an amount sufficient to substantially completely react and cross-link with the hydroxy-functionality present in the hydroxy-functional polyester resin, thermosetting acrylic resin, and hydroxy-terminal polybutadiene resin.

Blocked isocyanate resins are typically derived from the reaction products of a free di- and poly-isocyanates and isocyanate blocking agents. A wide variety of blocked isocyanates are useful in the practice of this invention. Free isocyanates, although not excluded, are generally not used as curing agents in this invention, since the primer composition is typically coil coated onto a metal substrate from a reservoir. In coil coating, the primer must have a sufficiently long pot life, such that the primer does not cure and harden prematurely in the reservoir.

The blocked isocyanate curing agent can be derived from any organic isocyanate, such as aliphatic, alicyclic, or aromatic di- or poly-isocyanate resins. Examples of suitable aliphatic diisocyanates commonly used, include 1,4-tetramethylene diisocyanate, 1,6-hexamethylene diisocyanate, and the like. Examples of suitable alicyclic diisocyanates, include 1,4-cyclohexyl diisocyanate, isophorone diisocyanate, 4,4'-methylene-bis-cyclohexyl isocyanate, and the like. Examples of suitable aromatic diisocyanates, include 4,4'-diphenylmethane diisocyanate, 1,3-phenylene diisocyanate, 1,4-phenylene diisocyanate, 2,4-toluene diisocyanate, and the like. Examples of suitable polyisocyanates, include 1,2,4-benzene triisocyanate, polymethylene polyphenyl isocyanate, and the like. The aforesaid di- and polyisocyanates can contain biuret, isocyanurate, urethane, and uretidione functional groups, and the like.

The blocking agent can be selected from those materials that react with the functional groups of the isocyanate to form stable adducts at room temperature to block cross-linking reactions with the hydroxyl groups of the resin components, but that can be dissociated at an elevated temperature to reproduce free isocyanate groups. Standard methods can be used to prepare the blocked isocyanates, for example, by biuretization, dimerization, trimerization, urethanization, and uretidionization of the starting monomeric isocyanates. Examples of suitable blocking agents, include lactams, such as caprolactam and butyrolactam, lower alcohols, such as methanol, ethanol, and isobutyl alcohol, oximes, such as methyl ethyl ketoxime and cyclohexanone oxime, phenols, such as phenol, p-t-butyl phenol and cresol, and pyrazoles, such as 3,5-dimethylpyrazole, and the like. In this invention, caprolactam, methyl ethyl ketoxime, and 3,5-dimethylpyrazole are the preferred blocking agents, with 3,5-dimethylpyrazole being especially preferred. The blocked isocyanates are preferably completely blocked, leaving substantially no free isocyanates.

3,5-Dimethyl pyrazole, in particular, has a unique ability to provide low temperature unblocking of the blocked isocyanates, thereby allowing for lower temperature cures without sacrificing the shelf stability of the primer. Typically the unblocking temperature of 3,5-dimethyl pyrazole ranges between about 240° F. and 280° F. It is believed that curing the primer at lower temperatures contributes in part to the dramatic reduction in popping defects found in the cured thick primer film. Preferred examples of 3,5-dimethyl pyrazole blocked isocyanates with low temperature unblocking abilities include, without limitation, the reaction product of the isocyanurate trimer of hexamethylene diisocyanate and 3,5-dimethyl pyrazole, the reaction product of the biuret of hexamethylene diisocyanate with 3,5-dimethyl pyrazole, and the reaction product of the isocyanurate trimer of isophorone diisocyanate with 3,5-dimethyl pyrazole.

The blocked isocyanate resin is generally present in the primer composition of the present invention in an amount ranging from about 3 to 20 percent by weight, and preferably and even more preferably from about 5 to 10 percent by weight, based on the total resin solids content of the primer composition.

Aminoplast resins are based on the reaction products of formaldehydes with amino- or amido-group carrying substances. A wide variety of aminoplast resins are useful in the practice of this invention. The aminoplast curing agent can include any organic solvent-soluble aminoplast resins. Examples of suitable aminoplast resins, include condensation products of aldehydes, particularly formaldehyde with melamine, urea, dicyanodiamide, benzoguanamine, glycouril, such as, hexamethoxymethyl melamine, commonly referred to as HMMM, and the like. In the present invention, hexamethoxymethyl melamine is the preferred aminoplast resin. It is believed that hexamethoxymethyl melamine, in particular, gives the primer enhanced intercoat adhesion with the top coat.

The aminoplast resin is generally present in the primer composition of the present invention in an amount ranging from about 1 to 10 percent by weight, and preferably and even more preferably from about 2 to 7 percent by weight, based on the total resin solids content of the primer composition.

The primer composition of the present invention comprises as a fifth component, a cure catalyst to increase the cross-link rate. A wide variety of cure catalysts for urethane cure systems can be used in the practice of this invention. Examples of suitable cure catalysts include, without limitation, tertiary amines, such as triethylene diamine, organometallic salts, particularly organotin compounds, such as dibutyltin dilaurate, dibutyltin dilauryl mercaptide, dibutyltin maleate, dimethyltin dichloride, dibutyltin di (2-ethylhexoate), dibutyltin diacetate, stannic chloride, ferric chloride, potassium oleate, and sulfonic acids, such as p-toluene sulfonic acid, dinonylnaphthalene sulfonic acid, or mixtures thereof, and the like.

The cure catalyst, when used, is provided in the primer composition of the present invention in an amount ranging from about 0.05 to 0.7 percent by weight, and preferably and even more preferably from about 0.1 to 0.5 percent by weight, based on the total resin solids of the primer composition.

The total resin solids content of the primer composition of the present invention preferably ranges from about 25 to 50 percent by weight, and more preferably from about 30 to 45 percent by weight, based on the total weight of the primer composition. The preferred amount of resin solids enables the primer to be coil coated onto metal substrates as relatively thick film coatings. This invention, however, includes primers based on higher or lower resin solids content.

The remainder of the solids portion of the primer composition of the present invention comprises a pigment or mixtures thereof. A wide variety of pigments are useful in the practice of the present invention. Especially preferred pigments suitable for use in the primer composition are anticorrosive chromate pigments, including strontium chromate, calcium chromate, zinc chromate and lead chromate, with strontium chromate being most preferred. Other suitable inorganic pigments include titanium dioxide, iron oxides, silica, talc, mica, clay, zinc oxide, carbon black, molybdate orange, calcium carbonate, barium sulfate, chromium oxide, iron black, lamp black, and the like. Certain of the aforesaid inorganic pigments can also serve as fillers as is well known in the art. Accordingly, the term "pigment" as used herein includes both pigments and fillers. Organic pigments can also be included in the coating composition. Examples of suitable organic pigments, include ultramarine blue, phthalocyamine blue, phthalocyamine green, quinacridone red, monastral, and the like.

The "pigment", including both pigment and filler content, when used, is generally present in the primer composition in amounts ranging from about 20 to 45 percent by weight, and preferably from about 25 to 40 percent by weight, based on the total weight of the primer composition.

In addition to the above-described components, the primer composition of the present invention can contain the usual additives that are well known in the art, such as, flow control agents, for example, acrylic polymer flow modifiers, thixotropic agents, light stabilizers, surfactants, wetting agents, dispersing aids, flattening agents, antioxidants, flocculating agents, foam control agents, and the like.

The balance of the primer composition of the present invention comprises an organic solvent or mixtures thereof. The primer coating composition of the invention is typically prepared by blending the components in a suitable organic solvent to facilitate formulation and liquid application. A wide variety of organic solvents can be used in the practice of the invention. Examples of suitable organic solvents include aromatic and aliphatic petroleum distillates, such as Aromatic 100, Aromatic 150, Aromatic 200, dibasic esters, V, M and P naptha, hexane, and the like, ketones, such as isophorone, methyl isobutyl ketone, methyl isoamyl ketone, diisobutyl ketone, and the like, alcohols, such as ethyl alcohol, propyl alcohol, diacetone alcohol, 2-ethyl hexanol, n-butanol, and the like, dimethyl phthalate, and mono- and dialkyl ethers of ethylene and diethylene glycol, such as ethylene glycol monoethyl ether, ethylene glycol monobutyl ether, ethylene glycol monoethyl ether acetate, propylene glycol monoethyl ether acetate, diethylene glycol monobutyl ether and diethylene glycol diethyl ether, and the like.

After blending the components of the primer together with solvents, the primer is then applied, preferably by the well known coil coating method to the surfaces of the metal substrate, whereupon the primer is generally cured through cross-linking at temperatures ranging from about 400° to 490° F. peak metal temperature, and preferably from about 435° to 465° F. peak metal temperature or lower, for a time ranging from about 10 seconds to about 1 minute in a coil coater, preferably from about 20 to 30 seconds. Conventional primers require a peak metal temperature of about 450° to 465° F. for normal oven dwell times. Whereas the primer of the present invention is capable of curing at lower peak metal temperatures at normal oven dwell times as shown above. Low temperature cures are desirable not only for reducing the extent of popping, but also for limiting the exposure of the metal substrate to heat that can alter the chemical or physical properties of substrate.

The present invention also relates to a method of providing a substrate, particularly a metal substrate, with a multi-layer coating, including at least one layer of the aforesaid primer coatings and at least one layer of a hereinbelow described top coating. The present invention also relates to a primer and top coated substrate, particularly a coil coated metal substrate.

The method comprises first applying a flexible, non-blistering, primer coating composition to a substrate, especially a metal substrate, although other substrates are not excluded. A variety of metal substrates are available for this coating method, for example, zinc aluminum coated steel, galvanized steel, electrogalvanized steel, cold-rolled steel, aluminum, and the like. The primer coating used in this step of the method has been described in detail above. As mentioned above, a dramatic aspect of the primer composition is that it is flexible after curing and solvent permeable during curing and hardening, which creates a primer suitable for thick dry film application without causing blisters, craters, pops, voids, and other imperfections on the coated surface. As also mentioned above, in applying the primer coating, the preferred coating technique is coil coating, although a variety of known coating techniques can be used.

In a preferred embodiment, the primer coating is applied in a suitable amount to yield a dry film thickness ranging from about 0.1 to 1.6 mils or greater after curing, and more preferably from about 0.8 to 1.6 mils, and typically from about 1.1 to 1.4 mils, with a blister-free and crater-free surface, which is generally not attainable with conventional primers at such high dry film thicknesses. Once the primer coating is applied to the substrate in the desired amount, the primer is cured by baking and drying at elevated temperatures prior to application of the top coat. This baking has the effect of removing the solvent and volatiles present as well as causing the coating layer to adhere to the substrate. As described above, the primer compositions of the present invention are generally baked at temperatures ranging from about 400° to 490° F. peak metal temperature, preferably from about 435° to 465° F. peak metal temperature or lower, for a time ranging from about 10 seconds to about 1 minute in a coil coater, preferably from about 20 to 30 seconds. Alternatively, the primer coating can be partially cured prior to application of a top coat.

After application and curing of the aforesaid primer coating, at least one top coat layer can be applied over the primer coating layer, also preferably by coil coating. The top coat can be any conventional organic solvent-based top coats, for example, fluorocarbons, polyesters, silicone polyesters and the like. In a preferred embodiment, the top coat is a conventional organic solvent-based fluorocarbon topcoat containing a fluorocarbon polymer, such as a polyvinylfluoride polymer or a polyvinylidene difluoride polymer, commonly referred to as PVDF, and the like or copolymers thereof. An example of a preferred fluorocarbon topcoat is sold under the trademark Fluoroceram by Morton International, Inc. of Chicago, Ill. The top coating is preferably pigmented with pigments known in the an that are anticorrosive and capable of resisting high temperature bake, although it can also be an unpigmented clear coating. In a preferred embodiment, the top coating is applied over the primer coating in an amount sufficient to form a layer with a dry film thickness ranging from about 0.1 to 1.0 mils, preferably 0.6 to 0.8 mils. The top coated substrate is then baked generally at a temperature ranging from about 465° F. to 480° F. peak metal temperature for a period ranging from about 10 seconds to 1 minute in a coil coater, preferably about 20 to 30 seconds. This final baking has the effect of removing solvent present within the coatings, as well as causing the coating layers to fuse together in a bonding process.

The coated metal substrate produced by the method of this invention includes a metal substrate coated with one or more layers of the aforesaid thick film primer and one or more layers of the aforesaid top coat. The preferred total dry film thickness of one primer coat and one top coat ranges from about 2.0 to 2.4 mils thick, and more preferably about 2.0 mils thick. It should be understood that the total thickness will vary when more than one primer layer or top coat layer is coated on the substrate.

In accordance with the invention, both coating layers are flexible and free of blisters, craters, pops, voids and other surface defects when cured on the metal substrate. Thus, the coated substrate has superior fabricability as thick films as a result of flexibility in the films and superior durability and corrosion resistance as a result of the elimination of surface defects from blistering, cratering, and popping during baking and hardening.

The invention will be further clarified by a consideration of the following non-limiting examples, which are intended to be purely exemplary of the invention.

EXAMPLE 1

Preparation of a Non-Blistering Thick Film Primer Composition

Table 1 below illustrates the preparation of a non-blistering primer composition of the present invention that is suitable for thick film coil coating application as the base coat on a metal substrate in accordance with the practice of this invention.

TABLE 1

| Ingredients | Parts By Weight |
|---|---|
| CHARGE TO DISPERSING MILL | |
| R-4898 Polyester Resin[1] | 18.45 |
| Dipropylene Glycol Methyl Ether | 3.05 |
| PM Acetate[2] | 3.06 |
| ADD UNDER SLOW AGITATION | |
| Disperbyk 110[3] | 0.32 |
| Sparmite[4] | 8.48 |
| TiPure R-900[5] | 6.57 |
| Zeospheres 200[6] | 3.92 |
| ASP 200 China Clay[7] | 1.80 |
| Strontium Chromate | 7.34 |
| SANDMILL TO 5½-6 NORTH STANDARD RECHARGE TO DISPERSING MILL AND ADD UNDER SLOW AGITATION | |
| R-4898 Polyester Resin | 21.46 |
| Isophorone | 0.35 |

TABLE 1-continued

| Ingredients | Parts By Weight |
|---|---|
| Dibasic Ester (DBE) | 1.73 |
| Resimene 747[8] | 1.74 |
| R-3401 Acrylic Resin[9] | 6.64 |
| Lovel 29[10] | 0.13 |
| Cycat 4040 Acid Catalyst[11] | 0.17 |
| PREMIX AND ADD UNDER SLOW AGITATION | |
| Glycol Ether MBE | 2.96 |
| Vesticoat UB 909-06[12] | 0.72 |
| Luxate HC1170[13] | 4.37 |
| Poly bd 600 Resin[14] | 3.24 |
| Metacure T-12[15] | 0.02 |
| ADJUST VISCOSITY | |
| Glycol Ether MBE | 3.49 |

[1]R-4898 polyester resin is a hydroxy-functional polyester resin derived from the reaction product of neopentyl glycol, 1,6-hexanediol, isophthalic acid, adipic acid, and terephthalic acid having a hydroxyl value of 40–50, an acid value of 1.5, and a weight average molecular weight of 7,850 and is used by Morton International, Inc. of Chicago, IL.
[2]PM Acetate is a propylene glycol methyl ether acetate solvent that is commercially available from Arco Chemical Co. of Philadelphia, PA.
[3]Disperbyk 110 is an anionic wetting and dispersing additive that is commercially available from Byk-Chemie of Wallingford, CT.
[4]Sparmite is a barium sulfate filler that is commercially available from Harcros Chemicals, Inc. of Fairview Heights, IL.
[5]TiPure R-900 is a titanium dioxide pigment that is commercially available from DuPont of Wilmington, DE.
[6]Zeospheres 200 is a silica sphere grinding aid that is commercially available from Zeelan Industries, of St. Paul, MN.
[7]ASP 200 China Clay is an aluminum silicate clay filler that is commercially available from Engelhard, Inc. of Iselin, NJ.
[8]Resimene 747 is a hexamethoxymethyl melamine aminoplast resin that is commercially available from Monsanto Corporation of St. Louis, MO.
[9]R-3401 acrylic resin is a thermosetting acrylic resin derived from the reaction product of acrylic acid, ethyl acrylate, methyl methacrylate, and N-(iso-butoxymethyl) acrylamide with 2,2-azobis(isobutyronitrile) with an acid value of 6–10 and weight avg. mol. wt. of between 1,000 and 1,000,000 and that is used by Morton International, Inc. of Chicago, IL.
[10]Lovel 29 is a flattening agent that is commercially available from PPG Industries, Inc. of Pittsburgh, PA.
[11]Cycat 4040 acid catalyst is a p-toluene sulfonic acid cure catalyst that is commercially available from King Industries, Inc. of Norwalk, CT.
[12]Vesticoat UB 909-06 is a hydroxyl functional blocked polyurethane curing agent that is commercially available from Huls, Inc. of Piscataway, NJ.
[13]Luxate HC 1170 is a low temperature unblocking, blocked aliphatic polyisocyanate curing agent comprising the reaction product of the isocyanurate trimer of hexamethylene diisocyanate and 3,5-dimethyl pyrazole and is commercially available from Olin Chemicals of Stamford, CT. Other useful low temperature unblocking, blocked aliphatic polyisocyanates that are commercially available from Olin Chemicals include, Luxate IC 1170 that is the reaction product of the isocyanurate trimer of isophorone diisocyanate and 3,5-dimethyl pyrazole, and Luxate HC 2170 that is the reaction product of the biuret of hexamethylene diisocyanate and 3,5-dimethyl pyrazole.
[14]Poly bd 600 Resin is a liquid hydroxyl-terminated epoxidized homopolymer of butadiene having the aforesaid general chemical formula (3) with an n of about 25, a number average molecular weight of about 2,600, an oxirane oxygen content of about 3.5%, a hydroxyl functionality of about 2.7, and a predominant microstructure of about 15% cis-, 55% trans-, and 30% vinyl-unsaturation, and that is commercially available from Elf Atochem, Inc. of Philadelphia, PA.
[15]Metacure T-12 is a dibutyl tin dilaurate cure catalyst that is commercially available from Air Products, Inc. of Allentown, PA.

EXAMPLE 2

Preparation of Non-Blistering Thick Film Primer Coated Galvanized Steel

The primer composition of Example 1 was roll coated onto a galvanized steel draw down panel at a thickness of about 2.3 mils thick. The primer composition was cured by baking in an oven at about 600° F. peak metal temperature for about 30 seconds. After cure, the final dry film thickness of the primer on the coated metal surface was about 1.1 mils thick. Upon visual inspection, no blisters or craters were apparent on the surface of the cured primer composition. The cured primer coated galvanized steel substrate was then subject to 180° bending along an axis to determine the flexibility of the cured primer. No film fracture or loss of adhesion was apparent during the bend test. Such satisfactory high film builds are generally not attainable with conventional primers.

EXAMPLE 3

Preparation of Non-Blistering Thick Film Primer and Top Coated Galvanized Steel

The cured primer coated galvanized steel of Example 2 was top coated with a fluorocarbon coating sold under the trademark Fluoroceram by Morton International, Inc. of Chicago, Ill. The fluorocarbon top coat composition was roll coated onto the primer coated galvanized steel substrate at a thickness of about 2.2 mils. The fluorocarbon top coat was cured by baking in an oven at about 600° F. peak metal temperature for about 30 seconds. After cure, the final dry film thickness of the top coat on the primer coated metal surface was about 0.9 mils. The total dry film thickness of the primer coat and top coat was about 2.0 mils. Upon visual inspection, no blisters or craters were apparent on the surface of the cured top coat composition. In accordance with ASTM B-117, the primer and top coat showed no field blisters and acceptable edge and scribe corrosion. Fluoroescent UV condensation exposure, commonly known as QUV exposure, was tested under ASTM G53-91. The primer and top coat performed adequately. Intercoat adhesion, that is, adhesion between the primer coat and top coat, was also tested and the coatings maintained adhesion after 4,000 hours of exposure using QUV 313 type bulbs.

EXAMPLES 4 TO 12

Preparation of Non-Blistering Thick Film Primer Compositions

Table 2 below illustrates the preparation of a number of non-blistering primer compositions of the present invention that are suitable for thick film coil coating applications as the base coat on a metal substrate in accordance with the practice of this invention.

TABLE 2

| | | Parts By Weight | | | | | | | | |
|---|---|---|---|---|---|---|---|---|---|---|
| Ingredients | Example | 4 | 5 | 6 | 7 | 8 | 9 | 10 | 11 | 12 |
| | CHARGE TO DISPERSING MILL | | | | | | | | | |
| R-4521 Polyester Resin[1] | | 18.6 | | | 18.5 | 18.5 | | | 18.5 | 18.5 |
| R-4898 Polyester Resin | | | 18.5 | 18.5 | | | 17.5 | 17.5 | | |
| DBE | | 3.6 | 3.6 | 3.6 | 3.6 | 3.6 | 2.9 | 2.9 | 3.6 | 3.6 |

TABLE 2-continued

| Ingredients | Example | 4 | 5 | 6 | 7 | 8 | 9 | 10 | 11 | 12 |
|---|---|---|---|---|---|---|---|---|---|---|
| PM Acetate | | 3.6 | 3.6 | 3.6 | 3.6 | 3.6 | 2.9 | 2.9 | 3.6 | 3.6 |
| ADD UNDER AGITATION | | | | | | | | | | |
| Disperbyk 110 | | 0.3 | 0.3 | 0.3 | 0.3 | 0.3 | 0.3 | 0.3 | 0.3 | 0.3 |
| Sparmite | | 9.5 | 11.4 | 11.4 | 8.4 | 8.4 | 8.4 | 8.4 | 8.4 | 8.4 |
| TiPure-R-900 | | 7.6 | 6.3 | 6.3 | 8.5 | 8.5 | 12.5 | 12.5 | 8.5 | 8.5 |
| Zeospheres 200 | | 4.0 | 4.8 | 4.8 | 5.7 | 5.7 | 3.7 | 3.7 | 5.7 | 5.7 |
| ASP 200 China Clay | | 2.9 | 2.8 | 2.8 | 3.7 | 3.7 | 1.7 | 1.7 | 3.7 | 3.7 |
| Strontium Chromate | | 7.3 | 6.3 | 6.3 | 5.3 | 5.3 | 5.3 | 5.3 | 5.3 | 5.3 |
| SANDMILL TO 5 ½-6 NORTH STANDARD | | | | | | | | | | |
| RECHARGE TO DISPERSING MILL AND THEN ADD UNDER AGITATION | | | | | | | | | | |
| R-4521 Polyester Resin | | 22.1 | | | 22.1 | 22.1 | | | 22.1 | 22.1 |
| R-4898 Polyester Resin | | | 22.1 | 22.1 | | | 23.5 | 23.5 | | |
| Isophorone | | 0.4 | | | | | | | | |
| DBE | | | 0.4 | 0.4 | 0.4. | 0.4 | 2.1 | 1.6 | 0.4 | 0.4 |
| R-3401 Acrylic Resin | | 6.8 | 6.7 | 6.7 | 6.7 | 6.7 | 6.3 | 6.3 | 6.7 | 6.7 |
| Resimene 747 | | 2.2 | 1.8 | 1.8 | 2.0 | 2.0 | 1.7 | 1.7 | 2.0 | 2.0 |
| Modaflow 2100[2] | | | 0.2 | 0.2 | | | | | | |
| Modaflow[3] | | | | | 0.5 | 0.5 | | | 0.5 | 0.5 |
| Cooks A-620[4] | | | | | | | | 0.5 | | |
| Lovel 29 | | 0.8 | | | 0.7 | 0.7 | 0.7 | 0.7 | 0.7 | 0.7 |
| Cycat 4040 | | 0.3 | 0.3 | 0.3 | 0.2 | 0.2 | 0.4 | 0.4 | 0.2 | 0.2 |
| PREMIX AND THEN ADD UNDER AGITATION | | | | | | | | | | |
| PM Acetate | | | 2.9 | 2.9 | 2.2 | 2.2 | | | | |
| Glycol Ether MBE | | 1.4 | | | | | | | 2.2 | 1.7 |
| Vesticoat UB 909 | | 0.8 | 0.5 | 0.5 | 0.5 | 0.5 | 0.7 | 0.7 | 0.5 | 0.5 |
| Luxate HC 1170 | | 4.1 | | 4.5 | 4.1 | 4.1 | 4.1 | 4.1 | | |
| Desmodur BL 3175[5] | | | 4.5 | | | | | | 4.1 | |
| Desmodur XP 7018E[6] | | | | | | | | | | 4.7 |
| Poly BD RA5HT[7] | | 4.0 | | | | | | | | |
| Poly BD 600 | | | 3.0 | 3.0 | | | 3.1 | 3.1 | | |
| Poly BD 605[8] | | | | | 3.0 | | | | 3.0 | 3.0 |
| Polyoil 110[9] | | | | | | 3.0 | | | | |
| Metacure T-12 | | 0.02 | 0.02 | 0.02 | 0.02 | 0.02 | 0.02 | 0.02 | 0.02 | 0.02 |
| MEK | | | | | | | 2.2 | 2.2 | | |

[1]R-4521 polyester resin is a hydroxy-functional polyester resin made from the same materials and having the same properties as the aforesaid R-4898 except for a higher acid value of 5, and that is used by Morton International, Inc. of Chicago, IL.
[2]Modaflow 2100 is an acrylic flow modifier that is commercially available from Monsanto Corporation of St. Louis, MO.
[3]Modaflow is an acrylic flow modifier that is commercially available from Monsanto Corporation of St. Lois, MO.
[4]Cooks A420 is an acrylic flow modifier that is commercially available from Cooks Composites and Polymers.
[5]Desmodur BL 3175 is a blocked aliphatic polyisocyanate that is commercially available from Bayer, Inc. of Pittsburgh, PA.
[6]Desmodur XP 7018E is a blocked aliphatic isocyanate that is available from Bayer, Inc. of Pittsburgh, PA.
[7]Poly bd R-45HT resin is a liquid hydroxyl-terminated polybutadiene polymer resin having the aforesaid general chemical formula (2) with an n of about 50, a number average molecular weight of about 2,700, a hydroxyl functionality of about 2.4–2.6, and a predominant microstructure of about 20% cis-, 60% trans-, and 20% vinyl-unsaturation, and that is commercially available from Elf Atochem, Inc. of Philadelphia, PA.
[8]Poly bd 605 resin is a liquid hydroxyl-terminated epoxidized polybutadiene polymer resin having the aforesaid general chemical formula (3) with an n of about 25, a number average molecular weight of about 2,400, an oxirane oxygen content of about 5.2%, a hydroxyl functionality of about 2.7, and a predominant microstructure of 15% cis-, 55% trans-, and 30% vinyl-unsaturation, and that is commercially available from Elf Atochem, Inc. of Philadelphia, PA.
[9]Polyoil 110 is a liquid polybutadiene resin having a molecular weight of 1,500, and that is commercially available from Huls, Inc. of Piscataway, NJ.

The invention having been disclosed in the foregoing embodiments and examples, other embodiments of the invention will be apparent to persons skilled in the art. The invention is not intended to be limited to the embodiments and examples, which are considered to be exemplary only. Accordingly, reference should be made to the appended claims to assess the true spirit and scope of the invention, in which-exclusive rights are claimed.

What is claimed is:

1. A non-blistering, thick film primer coating composition, which comprises:

(a) a hydroxy-functional polyester resin;
(b) a hydroxy-terminal polybutadiene resin;
(c) a blocked isocyanate crosslinker;
(d) an aminoplast crosslinker; and,
(e) a catalyst, in which components (a)–(e) comprise the resin solids of the primer composition, and the balance of the primer composition comprises:

(f) a pigment; and,
(g) a solvent.

2. The composition of claim 1, in which said blocked isocyanate crosslinker comprises at least one dimethyl pyrazole blocked isocyanate.

3. The composition of claim 2, in which said aminoplast crosslinker comprises at least one melamine-formaldehyde condensate.

4. The composition of claim 3, which further comprises:
(h) a thermosetting acrylic resin.

5. The composition of claim 1, in which the resin solids of said primer composition further comprises:
(h) a thermosetting acrylic resin.

6. The composition of claim 1, in which said hydroxy-terminal polybutadiene resin has the general chemical structure:

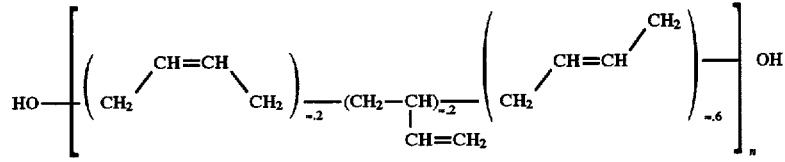

where n is from about 20 to about 60.

7. The composition of claim 1, in which said hydroxy-terminal polybutadiene is internally epoxidized and has the general chemical structure:

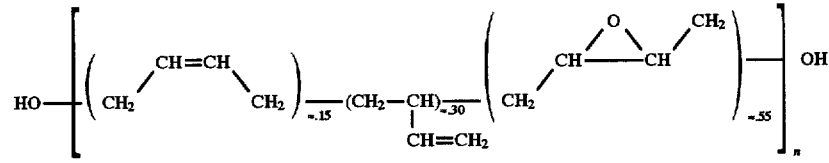

where n is from about 20 to about 60.

8. The composition of claim 2, in which said at least one dimethyl pyrazole blocked isocyanate is selected from the group of an isocyanurate trimer of hexamethylene diisocyanate blocked with 3,5-dimethyl pyrazole, an isocyanurate trimer of isophorone diisocyanate blocked with 3,5-dimethyl pyrazole, and a biuret of hexamethylene diisocyanate blocked with 3,5-dimethyl pyrazole.

9. The composition of claim 6, in which said at least one melamine-formaldehyde condensate comprises a hexamethoxymethyl melamine.

10. The composition of claim 4, in which said catalyst is selected from the group of a tertiary amine catalyst, an organotin catalyst, and a sulfonic acid catalyst, or mixtures thereof.

11. The composition of claim 1, in which said components (a)–(g) are provided in sufficient amounts to form upon heat curing a continuous, dry thick film of from about 0.8 to 1.6 mils thick that is virtually free of blisters, craters, voids, and other surface imperfections.

12. A non-blistering, thick film primer coating composition, which comprises an organic solvent solution of:
(a) from about 40 wt. % to about 92 wt. % of total resins solids of a hydroxy-functional polyester resin;
(b) from about 0 wt. % to about 15 wt. % of total resin solids of a thermosetting acrylic resin;
(c) from about 3 wt. % to about 15 wt. % of total resin solids of a hydroxy-terminal polybutadiene resin selected from the group of a hydroxy-terminal polybutadiene resin and a hydroxy-terminal epoxidized polybutadiene resin, or mixtures thereof;
(d) from about 3 wt. % to about 20 wt. % of total resin solids of a blocked isocyanate crosslinker comprising at least one dimethyl pyrazole blocked isocyanate;
(e) from about 1 wt. % to about 10 wt. % of total resin solids of an aminoplast crosslinker comprising at least one melamine-formaldehyde condensate;
(f) from about 0.05 wt. % to about 0.7 wt. % of total resin solids of a catalyst; and,
(g) a pigment.

13. The composition of claim 12, in which said resins solids comprises from about 25 wt. % to about 50 wt. % of the total weight of said composition.

14. The composition of claim 13, in which said pigment comprises from about 20 wt. % to about 45 wt. % of the total weight of said composition.

15. The composition of claim 12, in which said composition comprises a hydroxy-terminal polybutadiene resin that has the general chemical structure:

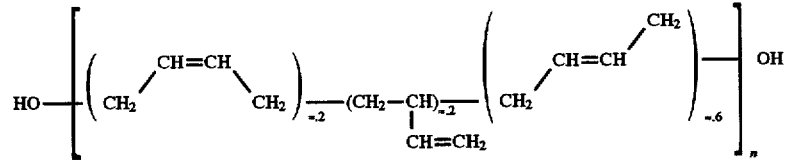

where n is from about 20 to about 60.

16. The composition of claim 12, in which said composition comprises a hydroxy-terminal epoxidized polybutadiene resin that has the general chemical structure:

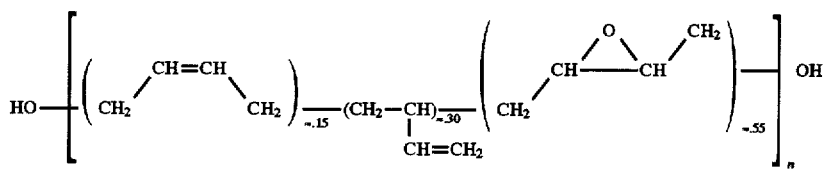

where n is from about 20 to about 60.

17. The composition of claim 12, in which said hydroxy-functional polyester resin has a hydroxyl value of from about 20 to about 120.

18. The composition of claim 12, in which said thermosetting acrylic resin has an acid value of from about 6 to 10.

19. The composition of claim 12, in which said pigment comprises an anticorrosive chromium-containing pigment.

20. The composition of claim 12, in which said composition is coil coated and heat cured onto a metal substrate to form a continuous, dry thick film of from about 0.8 to 1.6 mils thick that is virtually free of blisters, craters, voids, and other surface imperfections.

21. The composition of claim 12, in which said catalyst is selected from the group of a tertiary amine catalyst, an organotin catalyst, and a sulfonic acid catalyst, or mixtures thereof.

22. The composition of claim 12, which said composition comprises:

(a) from about 50 wt. % to about 85 wt. % of total resins solids of said hydroxy-functional polyester resin;

(b) from about 2 wt. % to about 15 wt. % of total resin solids of said thermosetting acrylic resin;

(c) from about 7 wt. % to about 15 wt. % of total resin solids of said hydroxy-terminal polybutadiene resin;

(d) from about 5 wt. % to about 10 wt. % of total resin solids of said blocked isocyanate crosslinker;

(e) from about 1 wt. % to about 10 wt. % of total resin solids of said aminoplast crosslinker;

(f) from about 0.05 wt. % to about 0.7 wt. % of total resin solids of said catalyst; and, (g) said pigment, and in which said resin solids comprises from about 30 wt. % to about 45 wt. % of the total weight of said composition, and said pigment comprises from about 25 wt. % to about 40 wt. % of the total weight of said composition.

23. The composition of claim 22, which said composition comprises:

(a) from about 60 wt. % to about 80 wt. % of total resins solids of said hydroxy-functional polyester resin;

(b) from about 5 wt. % to about 10 wt. % of total resin solids of said thermosetting acrylic resin;

(c) from about 8 wt. % to about 13 wt. % of total resin solids of said hydroxy-terminal polybutadiene resin;

(d) from about 5 wt. % to about 10 wt. % of total resin solids of said blocked isocyanate crosslinker;

(e) from about 2 wt. % to about 7 wt. % of total resin solids of said aminoplast crosslinker;

(f) from about 0.1 wt. % to about 0.5 wt. % of total resin solids of said catalyst; and, (g) said pigment.

24. A coated metal substrate coil coated with the primer coating composition of claim 12.

25. A coated metal substrate coil coated with the primer coating composition of claim 22.

26. A method of protecting a metal substrate with a composite protective coating, which comprises:

(a) applying an organic solvent solution of a non-blistering, thick film primer coating composition to a metal substrate to form a first primer layer, said primer coating composition comprising:

(i) from about 40 wt. % to about 92 wt. % of total resins solids of a hydroxy-functional polyester resin;

(ii) from about 0 wt. % to about 15 wt. % of total resin solids of a thermosetting acrylic resin;

(iii) from about 3 wt. % to about 15 wt. % of total resin solids of a hydroxy-terminal polybutadiene resin, a hydroxy-terminal epoxidized polybutadiene resin, or mixtures thereof;

(iv) from about 3 wt. % to about 20 wt. % of total resin solids of blocked isocyanate crosslinker;

(v) from about 1 wt. % to about 10 wt. % of total resin solids of an aminoplast crosslinker;

(vi) from about 0.05 wt. % to about 0.7 wt. % of total resin solids of a catalyst; and, (vii) a pigment;

(b) heat curing said first primer layer on said metal substrate;

(c) over coating said primer layer with a top coating composition to form a second top coat layer, said top coating composition selected from the group of a fluorocarbon polymer, a silicone polyester, and a polyester; and, (d) heat curing said second top coat layer on said primer layer to form a composite coated metal substrate.

27. The method of claim 26, in which both of said primer mating composition and said top coat coating composition are applied to the metal substrate by coil coating.

28. The method of claim 27 in which said first primer layer after curing forms a continuous, dry film finish having a thickness of from about 0.8 to 1.6 mils thick that is substantially free of blisters, craters, voids and other surface imperfections.

29. The method of claim 28, in which the total thickness of the first primer layer and second top coat layer is from about 2.0 to 2.4 mils thick that is substantially free of blisters, craters, voids and other surface imperfections.

30. The method of claim 29 in which said top coat is a fluorocarbon comprising a polyvinylidene difluoride polymer.

31. The method of claim 28 in which said heat curing of said first primer layer of step (b) comprises baking at a temperature from about 400° to about 480° F. peak metal temperature.

32. The method of claim 28, in which said heat curing of said second top coat layer of step (d) comprises baking at a temperature from about 450° to 480° F. peak metal temperature.

33. A coil coated composite metal substrate produced by the method of claim 26.

* * * * *

UNITED STATES PATENT AND TRADEMARK OFFICE
CERTIFICATE OF CORRECTION

PATENT NO.   : 5,688,598
DATED        : November 18, 1997
INVENTOR(S)  : KECK et al.

It is certified that error appears in the above-indentified patent and that said Letters Patent is hereby corrected as shown below:

| | |
|---|---|
| Col. 06, Ln. 37 | change "dede" to read -- dode --. |
| Col. 08, Ln. 09 | change "Can" to read -- can --. |
| Col. 14, Ln. 05 | change "an" to read -- art --. |
| Col. 17, 4th subscript | change "Cooks A420" to read -- Cooks A-620 --. |
| Col. 17, Ln. 09 | change "Poly BD RA5HT$^7$" to read -- Poly BD R-45HT$^7$ --. |
| Col. 17, Ln. 62 | change "which-exclusive" to read -- which exclusive --. |
| Col. 19, Ln. 44 | change "claim 6" to read -- claim 3-- |
| Col. 21, Ln. 27 | change "12 which" to read -- 12 in which-- |
| Col. 21, Ln. 48 | change "22 which" to read --22 in which-- |

UNITED STATES PATENT AND TRADEMARK OFFICE
CERTIFICATE OF CORRECTION

PATENT NO. : 5,688,598

DATED : November 18, 1997

INVENTOR(S) : KECK et al.

It is certified that error appears in the above-identified patent and that said Letters Patent is hereby corrected as shown below:

Col. 22, Ln. 42     change "mating" to read -- coating --.

Signed and Sealed this

Tenth Day of August, 1999

Attest:

Q. TODD DICKINSON

*Attesting Officer*     *Acting Commissioner of Patents and Trademarks*